US00RE47313E

(19) United States
(12) Reissued Patent
Phillips, II et al.

(10) Patent Number: US RE47,313 E
(45) **Date of Reissued Patent: *Mar. 19, 2019**

(54) SECURING DIGITAL CONTENT SYSTEM AND METHOD

(71) Applicant: Digital Reg of Texas, LLC, Marshall, TX (US)

(72) Inventors: Eugene B. Phillips, II, Raleigh, NC (US); Seth Ornstein, Silver Spring, MD (US)

(73) Assignee: DIGITAL REG OF TEXAS, LLC, Marshall, TX (US)

( * ) Notice: This patent is subject to a terminal disclaimer.

(21) Appl. No.: 15/815,505

(22) Filed: Nov. 16, 2017

Related U.S. Patent Documents

Reissue of:
(64) Patent No.: 9,191,376
Issued: Nov. 17, 2015
Appl. No.: 14/553,209
Filed: Nov. 25, 2014

U.S. Applications:
(63) Continuation of application No. 13/762,113, filed on Feb. 7, 2013, now Pat. No. 8,930,697, which is a
(Continued)

(51) Int. Cl.
*H04L 29/06* (2006.01)
*G06F 21/60* (2013.01)
(Continued)

(52) U.S. Cl.
CPC ..... *H04L 63/0442* (2013.01); *G06F 21/602* (2013.01); *G06F 21/6245* (2013.01);
(Continued)

(58) Field of Classification Search
CPC . H04L 63/045; H04L 63/0807; H04L 9/0866; H04L 9/3213; H04L 9/3271;
(Continued)

(56) References Cited

U.S. PATENT DOCUMENTS 4,471,163 A 9/1984 Donald et al.
4,528,643 A 7/1985 Freeny
(Continued)

FOREIGN PATENT DOCUMENTS

CA 2220457 5/1998
EP 0 717 338 6/1996
(Continued)

OTHER PUBLICATIONS

U.S. Appl. No. 60/058,623, filed Sep. 11, 1997, Peterson.
(Continued)

*Primary Examiner* — Minh Dieu Nguyen
(74) *Attorney, Agent, or Firm* — McGuireWoods LLP

(57) ABSTRACT

A system and method of encrypting digital content in a digital container and securely locking the encrypted content to a particular user and/or computer or other computing device is provided. The system uses a token-based authentication and authorization procedure and involves the use of an authentication/authorization server. This system provides a high level of encryption security equivalent to that provided by public key/asymmetric cryptography without the complexity and expense of the associated PKI infrastructure. The system enjoys the simplicity and ease of use of single key/symmetric cryptography without the risk inherent in passing unsecured hidden keys. The secured digital container when locked to a user or user's device may not open or permit access to the contents if the digital container is transferred to another user's device. The digital container provides a secure technique of distributing electronic content such as videos, text, data, photos, financial data, sales solicitations, or the like.

16 Claims, 10 Drawing Sheets

Related U.S. Application Data continuation of application No. 13/157,993, filed on Jun. 10, 2011, now Pat. No. 8,402,558, which is a continuation of application No. 12/181,442, filed on Jul. 29, 2008, now Pat. No. 7,979,697, which is a continuation of application No. 10/576,303, filed as application No. PCT/US2004/034494 on Oct. 20, 2004, now Pat. No. 7,421,741.

(60) Provisional application No. 60/512,091, filed on Oct. 20, 2003.

(51) Int. Cl.
*H04L 9/08* (2006.01)
*H04L 9/32* (2006.01)
*G06F 21/62* (2013.01)

(52) U.S. Cl.
CPC ..... *H04L 9/0825* (2013.01); *H04L 9/0866* (2013.01); *H04L 9/3213* (2013.01); *H04L 9/3271* (2013.01); *H04L 63/045* (2013.01); *H04L 63/061* (2013.01); *H04L 63/0807* (2013.01); *H04L 2209/56* (2013.01); *H04L 2209/603* (2013.01); *H04L 2463/101* (2013.01)

(58) Field of Classification Search
CPC . H04L 63/061; H04L 9/0825; H04L 63/0442; H04L 2463/101; H04L 2209/603; H04L 2209/56; G06F 21/602; G06F 21/6245
USPC ..... 726/2; 713/165; 705/50
See application file for complete search history.

(56) References Cited

U.S. PATENT DOCUMENTS 4,558,176 A 12/1985 Arnold et al.
4,658,093 A 4/1987 Hellman
4,683,553 A 7/1987 Mollier
4,796,220 A 1/1989 Wolfe
4,999,806 A 3/1991 Chernow et al.
5,023,907 A 6/1991 Johnson et al.
5,033,084 A 7/1991 Beecher
5,057,935 A 10/1991 Williams
5,191,611 A 3/1993 Lang
5,319,705 A 6/1994 Halter et al.
5,337,357 A 8/1994 Chou et al.
5,457,746 A 10/1995 Dolphin
5,490,216 A 2/1996 Richardson
5,509,070 A 4/1996 Schull
5,615,264 A 3/1997 Kazmierczak et al.
5,629,980 A 5/1997 Stefik et al.
5,671,276 A 9/1997 Eyer et al.
5,671,279 A 9/1997 Elgamal
5,673,316 A 9/1997 Auerbach et al.
5,677,953 A 10/1997 Dolphin
5,703,279 A 12/1997 Igura et al.
5,703,951 A 12/1997 Dolphin
5,708,709 A 1/1998 Rose
5,708,780 A 1/1998 Levergood et al.
5,715,314 A 2/1998 Payne et al.
5,724,424 A 3/1998 Gifford
5,734,822 A 3/1998 Houha et al.
5,757,907 A 5/1998 Cooper et al.
5,765,152 A 6/1998 Erickson
5,778,173 A 7/1998 Apte
5,778,367 A 7/1998 Wesinger, Jr. et al.
5,784,460 A 7/1998 Blumenthal et al.
5,790,664 A 8/1998 Coley et al.
5,790,790 A 8/1998 Smith et al.
5,794,207 A 8/1998 Walker et al.
5,796,952 A 8/1998 Davis et al.
5,809,145 A 9/1998 Silk et al.
5,845,281 A 12/1998 Benson et al.
5,889,943 A 3/1999 Ji et al.
5,892,825 A 4/1999 Mages et al.
5,892,900 A 4/1999 Ginter et al.
5,898,777 A 4/1999 Tycksen, Jr. et al.
5,905,860 A 5/1999 Olsen et al.
5,940,504 A 8/1999 Griswold
5,949,875 A 9/1999 Walker et al.
5,956,505 A 9/1999 Manduley
5,958,005 A 9/1999 Thorne et al.
5,958,051 A 9/1999 Renaud et al.
5,963,915 A 10/1999 Kirsch
6,014,688 A 1/2000 Venkatraman et al.
6,021,491 A 2/2000 Renaud
6,035,329 A 3/2000 Mages et al.
6,055,570 A 4/2000 Nielsen
6,067,526 A 5/2000 Powell
6,067,531 A 5/2000 Hoyt et al.
6,073,124 A 6/2000 Krishnan et al.
6,073,256 A 6/2000 Sesma
6,075,862 A 6/2000 Yoshida et al.
6,098,056 A 8/2000 Rusnak et al.
6,108,637 A 8/2000 Blumenau
6,134,592 A 10/2000 Montulli
6,135,646 A 10/2000 Kahn et al.
6,138,149 A 10/2000 Ohmura
6,144,942 A 11/2000 Ruckdashel
6,178,442 B1 1/2001 Yamazaki
6,192,396 B1 2/2001 Kohler
6,205,485 B1 3/2001 Kikinis
6,226,618 B1 5/2001 Downs et al.
6,236,971 B1 5/2001 Stefik et al.
6,240,396 B1 5/2001 Walker et al.
6,243,468 B1 6/2001 Pearce et al.
6,253,193 B1 6/2001 Ginter et al.
6,256,664 B1 7/2001 Donoho et al.
6,256,672 B1 7/2001 Redpath
6,266,692 B1 7/2001 Greenstein
6,286,103 B1 9/2001 Maillard et al.
6,288,738 B1 9/2001 Dureau et al.
6,289,461 B1 9/2001 Dixon
6,301,660 B1 10/2001 Benson
6,304,897 B1 10/2001 Venkatraman et al.
6,314,454 B1 11/2001 Wang et al.
6,327,610 B2 12/2001 Uchida et al.
6,332,156 B1 12/2001 Cho et al.
6,385,596 B1 5/2002 Wiser et al.
6,389,541 B1 5/2002 Patterson
6,449,719 B1 9/2002 Baker
6,484,156 B1 11/2002 Gupta et al.
6,526,456 B1 2/2003 Allan et al.
6,684,248 B1 1/2004 Janacek et al.
6,751,670 B1 6/2004 Patterson
6,807,534 B1 10/2004 Erickson
6,868,403 B1 3/2005 Wiser et al.
6,941,459 B1 9/2005 Hind et al.
6,965,993 B2 11/2005 Baker
7,010,808 B1 3/2006 Leung et al.
7,035,407 B1 4/2006 Hasegawa
7,036,011 B2 4/2006 Grimes et al.
7,127,515 B2 10/2006 Patterson
7,171,558 B1 1/2007 Mourad et al.
7,206,941 B2 4/2007 Raley et al.
7,233,948 B1 6/2007 Shamoon et al.
7,246,246 B2 7/2007 Kupka et al.
7,251,832 B2 7/2007 Venters et al.
7,272,858 B2 9/2007 Parks et al.
7,386,473 B2 6/2008 Blumenau
7,395,436 B1 7/2008 Nemovicher
7,395,438 B2 7/2008 Parks et al.
7,480,382 B2 1/2009 Dunbar et al.
7,484,103 B2 1/2009 Woo et al.
7,496,610 B2 2/2009 Boris et al.
7,562,150 B2 7/2009 Patterson
7,673,059 B2 3/2010 Patterson
7,752,466 B2 7/2010 Ginter et al.
7,904,568 B2 3/2011 Rudd
2002/0161709 A1 10/2002 Floyd et al.
2002/0194485 A1 12/2002 Ram et al.
2003/0046238 A1 3/2003 Nonaka et al.
2003/0046274 A1 3/2003 Erickson et al.

(56) References Cited

U.S. PATENT DOCUMENTS

| | | | |
|---|---|---|---|
| 2003/0079133 | A1 | 4/2003 | Breiter et al. |
| 2003/0120928 | A1 | 6/2003 | Cato et al. |
| 2003/0163431 | A1 | 8/2003 | Ginter et al. |
| 2003/0236906 | A1 | 12/2003 | Klemets et al. |
| 2004/0117500 | A1 | 6/2004 | Lindholm et al. |
| 2004/0125957 | A1 | 7/2004 | Rauber et al. |
| 2004/0153451 | A1 | 8/2004 | Phillips et al. |
| 2005/0004978 | A1 | 1/2005 | Reed et al. |
| 2005/0021477 | A1 | 1/2005 | Krishnan et al. |
| 2005/0021633 | A1 | 1/2005 | Venkatraman et al. |
| 2005/0049002 | A1 | 3/2005 | White et al. |
| 2006/0129847 | A1 | 6/2006 | Pitsos |
| 2006/0179489 | A1 | 8/2006 | Mas Ribes |
| 2006/0195400 | A1 | 8/2006 | Patterson |
| 2009/0100268 | A1 | 4/2009 | Garcia et al. |
| 2009/0259727 | A1 | 10/2009 | Patterson |

FOREIGN PATENT DOCUMENTS

| | | |
|---|---|---|
| JP | 9-044353 | 2/1997 |
| JP | 11-328848 | 11/1999 |
| JP | 2002-111613 | 4/2001 |
| JP | 2001-175606 | 6/2001 |
| JP | 2001-197055 | 7/2001 |
| JP | 2001-209309 | 8/2001 |
| JP | 2001-332019 | 11/2001 |
| JP | 2001-357008 | 12/2001 |
| JP | 2004-054930 | 2/2004 |
| WO | WO 96/27155 | 9/1996 |
| WO | WO 98/30964 | 7/1998 |
| WO | WO 98/58306 | 12/1998 |
| WO | WO 99/13398 | 3/1999 |
| WO | WO 02/01330 | 1/2002 |
| WO | WO 02/01335 | 1/2002 |

OTHER PUBLICATIONS

Adobe Systems Incorporated, "Adobe and eBooks," pp. 1-4 (Sep. 1999).

Adobe Systems Incorporated, "Adobe and Digital Content for eCommerce," pp. 1-8 (Sep. 1999).

Adobe Systems Incorporated, "Working with Adobe PDF Merchant," pp. 1-24 (2000).

Brad Cox, Superdistribution: Objects as Property on the Electronic Frontier (Addison-Wesley Publishing Company 1996).

IBM Corp., "Chapter 1. The Cryptolope Live! Product," IBM Cryptolope Live!, General Information Guide, Version 1, Release 1, pp. 1-36 (1997).

The Electronic Book Exchange System (EBX), Version 0.8 (Book Industry Study Group, Inc., Jul. 2000 Draft).

FLEXIm End User Manual, http://www.vcpc.univie.ac.at/information/software/pgi/flexuser/TOC.htm (Jun. 1996).

Marc A. Kaplan, "IBM Cryptolopes, SuperDistribution and Digital Rights Management," http://www.research.ibm.com/people/k/kaplan (1996).

Ulrich Kohl et al., "Safeguarding Digital Library Contents and Users," D-Lib Magazine, http://www.dlib.org/dlib/september97/ibm/09lotspiech.html (Sep. 1997).

Jean-Henry Morin et al., "Commercialization of Electronic Information," IEEE International Conference on Multimedia Computing and Systems, vol. 2, pp. 524-529 (Jun. 7-11, 1999).

"Semantic Web, Recent Trends of technologies and applications in the Semantic Web", Makoto Imamuma, et al. Jan. 31, 2003.

"Open Digital Rights Language (ODRL)", Version 1.1, Renato lannella, Aug. 8, 2002.

Invalidity chart for U.S. Pat. No. 7,421,741 by U.S. Pat. No. 5,673,316 as submitted in Civil Action No. 6:11-cv-00305-LED, in the U.S. District Court for the Eastern District of Texas, Tyler Division (Feb. 2012).

Invalidity chart for U.S. Pat. No. 7,421,741 by U.S. Pat. No. 5,765,152 as submitted in Civil Action No. 6:11-cv-00305-LED, in the U.S. District Court for the Eastern District of Texas, Tyler Division (Feb. 2012).

Invalidity chart for U.S. Pat. No. 7,421,741 by U.S. Pat. No. 6,098,056 as submitted in Civil Action No. 6:11-cv-00305-LED, in the U.S. District Court for the Eastern District of Texas, Tyler Division (Feb. 2012).

Invalidity chart for U.S. Pat. No. 7,421,741 by U.S. Pat. No. 6,226,618 as submitted in Civil Action No. 6:11-cv-00305-LED, in the U.S. District Court for the Eastern District of Texas, Tyler Division (Feb. 2012).

Invalidity chart for U.S. Pat. No. 7,421,741 by U.S. Published Patent Application No. 2009/0100268 as submitted in Civil Action No. 6:11-cv-00305-LED, in the U.S. District Court for the Eastern District of Texas, Tyler Division (Feb. 2012).

Invalidity chart for U.S. Pat. No. 7,421,741 by PCT Publication No. WO 2002/01330 as submitted in Civil Action No. 6:11-cv-00305-LED, in the U.S. District Court for the Eastern District of Texas, Tyler Division (Feb. 2012).

Invalidity chart for U.S. Pat. No. 7,421,741 by PCT Publication No. WO 2002/01335 as submitted in Civil Action No. 6:11-cv-00305-LED, in the U.S. District Court for the Eastern District of Texas, Tyler Division (Feb. 2012).

Invalidity chart for U.S. Pat. No. 7,421,741 by Adobe Digital Commerce as submitted in Civil Action No. 6:11-cv-00305-LED, in the U.S. District Court for the Eastern District of Texas, Tyler Division (Feb. 2012).

Invalidity chart for U.S. Pat. No. 7,421,741 by Adobe PDF Merchant as submitted in Civil Action No. 6:11-cv-00305- LED, in the U.S. District Court for the Eastern District of Texas, Tyler Division (Feb. 2012).

Invalidity chart for U.S. Pat. No. 7,421,741 by Cryptolope Live as submitted in Civil Action No. 6:11-cv-00305-LED, in the U.S. District Court for the Eastern District of Texas, Tyler Division (Feb. 2012).

Invalidity chart for U.S. Pat. No. 7,421,741 by EBX Standard as submitted in Civil Action No. 6:11-cv-00305-LED, in the U.S. District Court for the Eastern District of Texas, Tyler Division (Feb. 2012).

Invalidity chart for U.S. Pat. No. 7,421,741 by Kaplan as submitted in Civil Action No. 6:11-cv-00305-LED, in the U.S. District Court for the Eastern District of Texas, Tyler Division (Feb. 2012).

Invalidity chart for U.S. Pat. No. 7,421,741 by Kohl as submitted in Civil Action No. 6:11-cv-00305-LED, in the U.S. District Court for the Eastern District of Texas, Tyler Division (Feb. 2012)d).

Invalidity chart for U.S. Pat. No. 7,421,741 by Morin as submitted in Civil Action No. 6:11-cv-00305-LED, in the U.S. District Court for the Eastern District of Texas, Tyler Division (Feb. 2012).

Invalidity chart for U.S. Pat. No. 7,421,741 by Sibert as submitted in Civil Action No. 6:11-cv-00305-LED, in the U.S. District Court for the Eastern District of Texas, Tyler Division (Feb. 2012).

Invalidity chart for U.S. Pat. No. 7,421,741 by TragoeS FAQ as submitted in Civil Action No. 6:11-cv-00305-LED, in the U.S. District Court for the Eastern District of Texas, Tyler Division (Feb. 2012).

Invalidity chart for U.S. Pat. No. 7,421,741 by ZipLock White Paper as submitted in Civil Action No. 6:11-cv-00305-LED, in the U.S. District Court for the Eastern District of Texas, Tyler Division (Feb. 2012).

Invalidity chart for U.S. Pat. No. 7,421,741 by U.S. Published Patent Application No. 2004/0125957 as submitted in Civil Action No 6:11-cv-00305-LED, in the U.S. District Court for the Eastern District of Texas, Tyler Division (Feb. 2012).

Invalidity chart for U.S. Pat. No. 7,421,741 by U.S. Published Patent Application No. 2004/0153451 as submitted in Civil Action No. 6:11-cv-00305-LED, in the U.S. District Court for the Eastern District of Texas, Tyler Division (Feb. 2012).

Invalidity chart for U.S. Pat. No. 7,421,741 by U.S. Published Patent Application No. 2005/0021477 as submitted in Civil Action No. 6:11-cv-00305-LED, in the U.S. District Court for the Eastern District of Texas, Tyler Division (Feb. 2012).

(56) References Cited

OTHER PUBLICATIONS

Invalidity chart for U.S. Pat. No. 7,421,741 by U.S. Published Patent Application No. 2006/0129847 as submitted in Civil Action No. 6:11-cv-00305-LED, in the U.S. District Court for the Eastern District of Texas, Tyler Division (Feb. 2012).
Invalidity chart for U.S. Pat. No. 7,421,741 by U.S. Published Patent Application No. 2006/0179489 as submitted in Civil Action No 6:11-cv-00305-LED, in the U.S. District Court for the Eastern District of Texas, Tyler Division (Feb. 2012).
Invalidity chart for U.S. Pat. No. 7,421,741 by U.S. Pat. No. 6,301,660 as submitted in Civil Action No. 6:11-cv-00305-LED, in the U.S. District Court for the Eastern District of Texas, Tyler Division (Feb. 2012).
Invalidity chart for U.S. Pat. No. 7,421,741 by U.S. Pat. No. 6,868,403 as submitted in Civil Action No. 6:11-cv-00305-LED, in the U.S. District Court for the Eastern District of Texas, Tyler Division (Feb. 2012).
Invalidity chart for U.S. Pat. No. 7,421,741 by U.S. Pat. No. 7,010,808 as submitted in Civil Action No. 6:11-cv-00305-LED, in the U.S. District Court for the Eastern District of Texas, Tyler Division (Feb. 2012).
Invalidity chart for U.S. Pat. No. 7,421,741 by U.S. Pat. No. 7,206,941 as submitted in Civil Action No. 6:11-cv-00305-LED, in the U.S. District Court for the Eastern District of Texas, Tyler Division (Feb. 2012).
Invalidity chart for U.S. Pat. No. 7,421,741 by U.S. Pat. No. 7,272,858 as submitted in Civil Action No. 6:11-cv-00305-LED, in the U.S. District Court for the Eastern District of Texas, Tyler Division (Feb. 2012).
Olin Sibert et al., "DigiBox: A Self-Protecting Container for Information Commerce," Proceedings of the First USENIX Workshop on Electronic Commerce (Jul. 1995).
TragoeS, "RightsMarket Frequently Asked Questions (FAQ)," http://web.archive.org/web/19980209124057/tragoes.com/FAQ.html (Jun. 30, 1997).
Portland Soft. Intros. "ZipLock ESD Commerce Sys. For Microsoft Site Ser. 3.0, Commerce Ed.," http://www.fillipdesign.com/portfolio/www/portsoft/info/press/pr012698.htm(1998).
"ZipLock Server Delivers the flexibility to do ESD business your way," http://www.fillipdesign.com/portfolio/www/ziplock/system3/components/compsrvr.html (1997).
Portland Software, "ZipLock White Paper," http://web.archive.org/web/19970129185917/www.portsoft.com/zipwhite.htm (Jan. 27, 1997).
Expert Report of Dr. Stepher B. Wicker Regarding Invalidity of U.S. Pat. Nos. 6,389,541, 6,751,670, 7,127,515, 7,272,655, 7,562,150, 7,421,741, and 7,673,059; Case No. 12-CV-01971 CW; United States District Court Northern District of California Oakland Division; 2013.
Supplementary European Search Report dated Jan. 17, 2006.
International Search Report and Written Opinion of the International Searching Authority for PCT/US04/34494; dated Jan. 31, 2005.
Japanese Office Action from Japanese Application 2006-507079, mailed Jan. 26, 2010.
Invalidity chart for U.S. Pat. No. 7,421,741 by U.S. Pat. No. 7,395,436 as submitted in Civil Action No. 6:11-cv-00305-LED, in the U.S. District Court for the Eastern District of Texas, Tyler Division (Feb. 2012).
Invalidity chart for U.S. Pat. No. 7,421,741 by U.S. Pat. No. 7,395,438 as submitted in Civil Action No. 6:11-cv-00305-LED, in the U.S. District Court for the Eastern District of Texas, Tyler Division (Feb. 2012).
Invalidity chart for U.S. Pat. No. 7,421,741 by U.S. Pat. No. 7,904,568 as submitted in Civil Action No. 6:11-cv-00305-LED, in the U.S. District Court for the Eastern District of Texas, Tyler Division (Feb. 2012).
Invalidity chart for U.S. Pat. No. 7,421,741 by U.S. Published Patent Application No. 2002/0161709 as submitted in Civil Action No. 6:11-cv-00305-LED, in the U.S. District Court for the Eastern District of Texas, Tyler Division (Feb. 2012).
Invalidity chart for U.S. Pat. No. 7,421,741 by U.S. Published Patent Application No. 2003/0079133 as submitted in Civil Action No. 6:11-cv-00305-LED, in the U.S. District Court for the Eastern District of Texas, Tyler Division (Feb. 2012).

SECURING DIGITAL CONTENT SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This] *The present application is a reissue application of U.S. Pat. No. 9,191,376 issued Nov. 17, 2015 from application Ser. No. 14/553,209, filed Nov. 25, 2014. Application Ser. No. 14/553,209* is a continuation application of [co-pending] U.S. non-provisional application Ser. No. 13/762,113 filed Feb. 7, 2013 *now U.S. Pat. No. 8,930,697* which is a continuation of U.S. non-provisional application Ser. No. 13/157,993 filed Jun. 10, 2011 now U.S. Pat. No. 8,402,558 which is a continuation of U.S. non-provisional application Ser. No. 12/181,442 now U.S. Pat. No. 7,979,697 which is a continuation of prior U.S. non-provisional application Ser. No. 10/576,303, filed Apr. 19, 2006 now U.S. Pat. No. 7,421,741, which is the National Stage Application of International Patent Application PCT/US2004/034494 filed Oct. 20, 2004, and claims priority to and the benefit of U.S. Provisional Application 60/512,091 filed on Oct. 20, 2003, the disclosures of which are all hereby incorporated by reference in their entirety.

BACKGROUND OF THE INVENTION

1. Field of the Invention

The invention generally relates to encrypting digital content, and more specifically, to securely locking encrypted digital media to a particular user, computer or other computing device.

2. Background Description

Any owner or distributor of secure or copyrighted digital content, i.e., electronic data in any form, may face several problems concerning the encryption of the data and the method of access that is provided to an end user. The owner or distributor typically is compelled to provide a robust method of encryption while remaining within a system that is relatively easy and simple for users to operate. In order to be relatively effective and/or easy to use, the system provided by owners or distributors must typically allow users to repeatedly access the material while requiring that they undergo an authentication, approval or payment process under a set of rules determined by the content owner. For example, the user may access the content an unlimited number of times after approval, or the user may have to regain approval after a certain number of accesses and/or after a certain amount of time has passed. Normally, content owners require substantial confidence and assurance that once approved for access by a particular user on a particular device the content cannot be freely accessed by another user especially if the content is transmitted to another machine or device.

Currently, most content originators and distributors utilize a Public Key Infrastructure, or PKI system, to accomplish these functions. The PKI system utilizes public key or asymmetric cryptography in which a public key and a private key are produced at the time that the content file is encrypted. This PKI system typically has the following properties or requires the use of:

(i) A certificate authority that issues and verifies a digital certificate. A digital certificate includes the public key, information about the public key or other licensing information.

(ii) A registration authority that acts as the verifier for the certificate authority before a digital certificate is issued to a requestor.

(iii) One or more directories where the certificates (with their public keys) are held.

(iv) A certificate management system.

This PKI system is quite complex and very often is an operational and financial burden for content originators, distributors and users.

An alternative encryption system is symmetric cryptography. A symmetric system utilizes a secret or hidden key that is shared by both the sender and recipient of the encrypted data. While much simpler to use and substantially less costly to implement, a common drawback may be that if the secret key is discovered or intercepted, the encrypted data can easily be decrypted and stolen. However, if a method and system for protecting the secret key, itself, can be provided so that the secret key is not exposed to discovery or interception, including an end user, then a very reliable and effective procedure and system for securely delivering electronic content is possible while avoiding the significant burdens of a PKI infrastructure.

SUMMARY OF THE INVENTION

An aspect of the invention provides a method for creating a digital container and encrypting the contents of the digital container with a symmetric encryption technique. The method also provides for protecting the symmetric decryption keys by inserting the symmetric decryption keys into header associated with a data block in the digital container and encrypting the header using an asymmetric encryption algorithm. Upon an attempted access of the container by a user, the header is re-encrypted using data from the user's device and/or the user so that the contents of the digital container are now locked to the user's device or to the user. Transaction data such as credit card information or account information may also be obtained from the user, perhaps for paying for the contents of the container or other service, which may be verified and used to gain access to the contents. Once the container has been locked to the user's device or user, the container may only be opened and accessed on that device or by that user. If the digital container were to be transmitted to another device, the digital container recognizes that the footprint of the device has changed or the user is different and may not open until a re-authorization has been performed which may involve a financial transaction.

A further aspect of the invention includes a system for creating a digital container and encrypting the contents of the digital container with a symmetric encryption technique. The system also provides for protecting the summetric decryption keys by inserting the symmetric decryption keys into header associated with a data block in the digital container and encrypting the header using an asymmetric encryption algorithm. Upon an attempted access of the container by a user, the system re-encrypts the header using data from the user's device such as a machine footprint and/or the user such as a client fingerprint so that the contents of the digital container are now locked to the user's device or to the user. The system may also acquire transaction data such as credit card information or account information from the user, perhaps for paying for the contents of the container or other service, which may be verified and used to gain access to the contents. Once the container has been locked to the user's device or user, the system provides that the container may only be opened and accessed on that device or by that user. If the digital container were to be transmitted to another device, the system recognizes that the footprint of the device has changed or the user is different and may not open until a re-authorization has been performed which may involve a financial transaction.

In another aspect of the invention, a computer program product comprising a computer usable medium having readable program code embodied in the medium is provided. The computer program product includes at least one component to create a digital container and to encrypt the contents of the digital container with a symmetric encryption technique. The at least one component also protects the symmetric decryption keys by inserting the symmetric decryption keys into header associated with a data block in the digital container and encrypting the header using an asymmetric encryption algorithm. Upon an attempted access of the container by a user, the at least one component re-encrypts the header using data from the user's device and/or the user so that the contents of the digital container are now locked to the user's device or to the user. The at least one component may also obtain transaction data such as credit card information or account information from the user, perhaps for paying for the contents of the container or other service, which may be verified and used to gain access to the contents. Once the container has been locked to the user's device or user, the container may only be opened and accessed on that device or by that user.

In another aspect, a method of securely delivering data is provided. The method includes creating a container having electronic content and a container identifier, encrypting at least one data block of the electronic content using a symmetric encryption technique and encrypting a header associated with a first data block of the electronic content using an asymmetric encryption technique, the header including a symmetric decryption key, and re-keying the header using data associated with a user or a user's device to lock at least a portion of the electronic content to the user or the user's device, wherein the locked at least a portion of the electronic content can only be decrypted and accessed by the user or on the user's device when the user or user's device has been authenticated against at least the container identifier.

In another aspect, a computer program product comprising a computer usable medium having readable program code embodied in the medium is provided. The computer program product includes at least one component to create a container having electronic content and a container identifier, determine at least one data block for partitioning the electronic content, encrypt the at least one data block of the electronic content using a symmetric encryption technique and to encrypt a header associated with a first data block of the electronic content using an asymmetric encryption technique, the header including a symmetric decryption key, re-key the header using data associated with a user or a user's device to lock at least a portion of the electronic content to the user or the user's device, wherein the locked at least a portion of the electronic content can only be decrypted and accessed by the user or on the user's device when the user or user's device has been authenticated against at least the container identifier, and decrypt the locked portion of the electronic content when the user or user's device has been authenticated.

In another aspect, a computer-implemented method of securely delivering data is provided. The computer-implemented method includes creating a container having electronic content and a container identifier, encrypting at least one data block of the electronic content using a symmetric encryption technique and encrypting a header associated with a first data block of the electronic content using an asymmetric encryption technique, the header including a symmetric decryption key, and re-keying the header using at least a portion of the container identifier and data associated with a user or a user's device to lock at least a portion of the electronic content to the user or the user's device, wherein the locked at least a portion of the electronic content can only be decrypted and accessed by the user or on the user's device when the user or user's device has been authenticated against at least the container identifier, and wherein the step for re-keying creates a unique value for the header for every different container delivered to the user's device.

In another aspect, a computer-based method for accessing content is provided. The method includes transmitting an electronic container having files of electronic content and a container identifier, wherein at least one data block of the electronic content is encrypted using a symmetric encryption technique and a header associated with a first data block of the electronic content is encrypted using an asymmetric encryption technique, the header including a symmetric decryption key, and transmitting a permission token based on an attempt to access the electronic content to grant access to the electronic content, wherein at least the symmetric decryption key is re-encrypted for each occurrence of transmitting the permission.

DETAILED DESCRIPTION OF EMBODIMENTS OF THE INVENTION

The invention provides a system and method of encrypting electronic content using symmetric encryption without exposing the decryption key to discovery or interception. In embodiments, delivery of the electronic content from a creator to an end user may be accomplished by digital containers that employ protected key symmetric encryption. The invention combines the robustness equivalent to PKI encryption but with the simplicity and cost effectiveness of symmetric/secret key cryptography. U.S. Provisional Application Ser. No. 0/512,091, filed Oct. 20, 2003 is incorporated by reference herein in its entirety.

An aspect of the invention involves a unique process that is used to "re-key" the "hidden" keys sent with the electronic content, often in digital containers, with a value that contains data specific to the user and/or the user's device. This "re-keying" (i.e., re-encrypting) is typically performed on the user's device without ever exposing the content in an unencrypted form, thus the keys themselves are maintained securely and eliminates the potential for compromising the electronic data and/or the keys. During "re-keying", the "re-keyed" keys may also be associated with the original user's device in such a way as to effectively inhibit any unauthorized access to the electronic content. This is especially useful, if and when, the electronic content might be further propagated to other user's devices, such as by email, copied disks, or peer-to-peer communications, for example. These other users are effectively denied access to the electronic content since the electronic content has been re-keyed and associated with the original user and/or original user's device. After the "re-keying" process executes, the content inside the container is "locked" to a particular device and/or a particular user.

Figure 1:
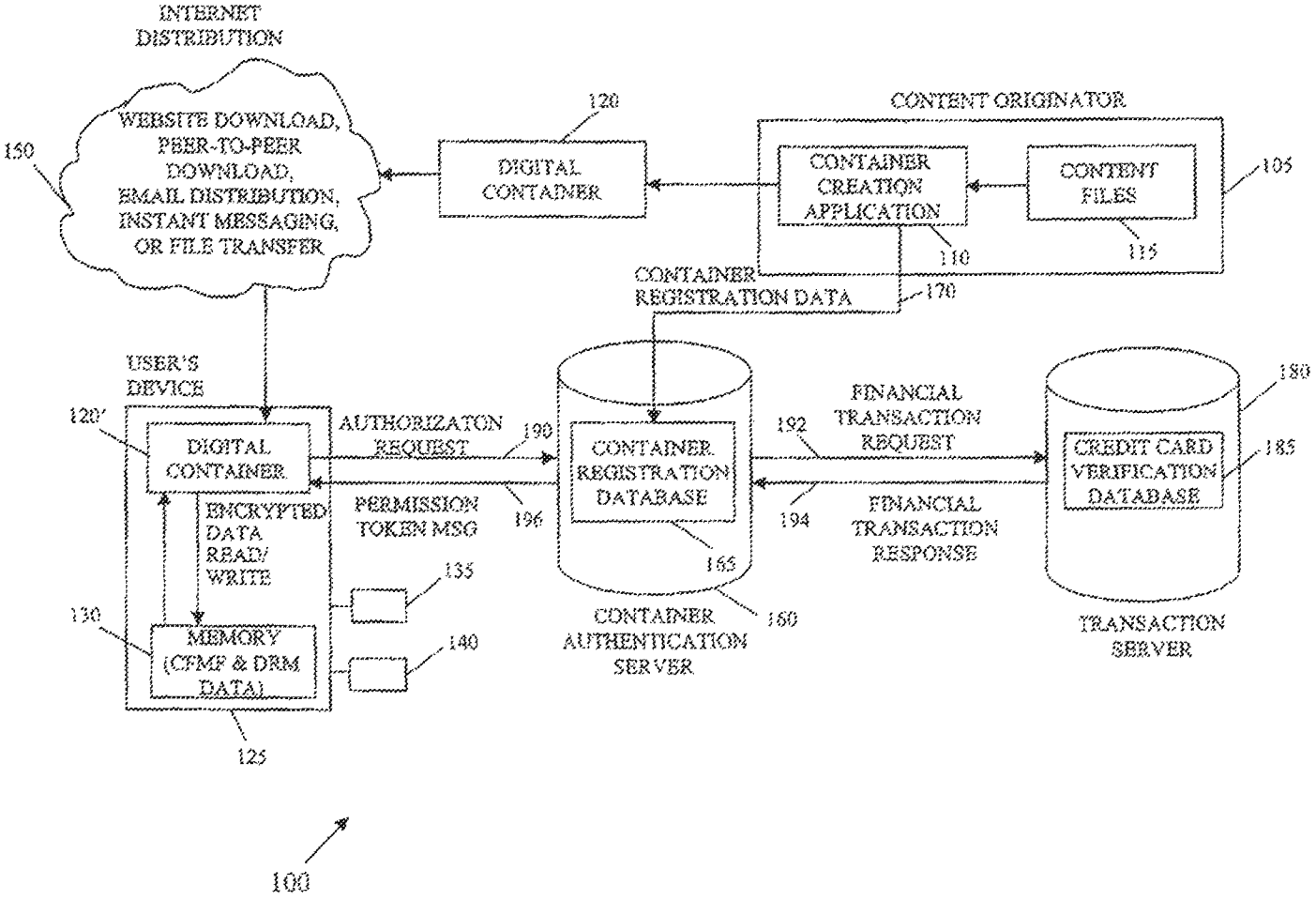
FIG. 1 is a functional block diagram of an embodiment of the system of the invention.

FIG. 1 is a functional block diagram of an embodiment of the system of the invention, generally denoted by reference numeral 100. FIG. 1 also illustrates several steps associated with processes of the invention. The system 100 includes a content originator device 105 which includes a container creation application 110 (which may alternatively execute on a server or separate container creation computer) and content file or files 115 such as video, text, streaming media, audio, animation, music, financial transaction data, or any other type of data for inclusion in the production of a secure digital container (SDC) 120. The container creation application 110 also provides for encrypting electronic content such as the content files 115.

Further included in the system 100 is a user's device 125 (e.g., a computer controlled device such as a personal computer, a cable receiver box, compact disk (CD) player, television, digital video disk (DVD) player, satellite receiver, personal digital assistant (PDA), or the like) that may receive the electronic content 115, typically via a SDC 120. In embodiments, the SDC 120 may be delivered to a user's computer via a CD or DVD. The user's device 125 may be interconnected via a network 150, such as the Internet, for transmission of the SDC 120 to the user's device 125. The network may be any type of network such as wired, wireless, phone system, or the like. The SDC 120 may be delivered via any number of various known techniques including website download, peer-to-peer download, email, instant messaging (IM), file transfer protocols, or the like. (For clarity, once the SDC 120 has been transmitted or is otherwise present on the user's device, the SDC on the user's device is denoted by reference numeral 120')

The user's device 125 also includes memory 130 for storing various data items such as digital rights management (DRM) data and a Client Fingerprint Mode Flag (CFMF), also described in more detail below. The user's device 125 may also include a hard drive, compact disk (CD) drives or a digital video disk (DVD) drive, generally denoted by reference numeral 135. The user's device 125 may also include an external hardware identification device 140 for providing input for authenticating a user such as a biometric authentication device or card reader, for example.

The system 100 may also include a container authentication server 160 (also referred to as a container verification server), which in embodiments, may oversee operations of a container registration database 165. In embodiments, database 165 may be distributed. The container authentication server also manages attempts to open the container by a user and coordinates permissions, authentications and portions of the re-keying sequences of a digital container using the container ID and container registration database 165. This may also include managing financial transactions associated with the container assess. Also included in the system 100 may be a transaction server 180 (e.g., an IPayment, Inc. Gateway server) for receiving financial transaction requests such as credit card or debit transactions when a user chooses to purchase a service or item controlled by the SDC 120', and for providing a response to the request which validates a purchase, as described more fully below.

In one application, the container creation application 110 encrypts the one or more content files 115 (or any subset of the content files) and incorporates the one or more content files 115 into the secure digital container 120. Once the SDC 120 has been constructed, usage rights parameters as selected by the content originator, along with other SDC registration data, may be stored in the container registration database 165, as denoted by reference numeral 170. The usage rights may include, but not limited to, limiting accesses to the content files to a certain number of occurrences, limiting access to a period of time, limiting copying of the content files (or portions thereof), limiting the copying to a secondary device, limiting the burning of the content file to storage media such as CD or DVD or controlling printing, to name a few.

Once the SDC 120 is transmitted or released to a user (or users), or perhaps to an Internet site to be discovered and downloaded by users or potential customers of the electronic content, a user may attempt to open the SDC 120' on their device 125 (or attempts to open portions of the SDC 120'). When the attempt to access or open the SDC 120' occurs, executable code either in the SDC 120' or already on the user's device opens a secure link to the container verification server 160 and sends an authorization request message 190. This authorization request message 190 includes data specific to the user or the user's device.

This authorization request message 190 may also include financial transaction information, such as credit/debit card data or user identification data (e.g., account numbers, social security numbers, telephone numbers, alias names, or the like) perhaps for Internet payment services such as online payment services provided by PayPal™, Inc, or the like. If a financial transaction is involved, then this data may be sent to the transaction server 180 (e.g., an iPayment, Inc. Gateway server, or the like) in a financial transaction request message 192. Once this request is processed, transaction approval or denial data may be returned to the container authentication server 160 in a financial transaction response message 194.

After receiving the financial transaction response message 194, the container authentication server 160 may create an authentication request response called a permission token message, as denoted by reference numeral 196. This permission token message contains a permission token that is typically a relatively small bit string that includes the financial transaction approval or denial data, the contents usage rights data, permission flags and re-encryption data that is now unique to both the SDC 120' and the user and/or the user's device, as explained more fully below.

When the permission token 196 is returned to the SDC 120' on the user's device 125, the container executable code may read the token bit string and may write the usage rights data and a permission flag called a client fingerprint mode flag (CFMF) to a confidential (e.g., unpublished or hidden) location such as memory 130 on the user's device 125. Alternatively, this confidential location may be a storage device such as a disk, DVD, or external storage device.

Once this CFMF and usage rights data have been stored, any future or subsequent attempt to re-open the container causes the container executable code to detect the stored CFMF resulting in the SDC 120' opening, potentially limited by the usage rights data, without having to repeat the authentication process. The function of the CFMF and the usage rights data will be discussed in greater detail below.

Also, when the container executable code receives the re-encryption data, the container executable code uses the re-encryption data (i.e., returned with the permission token) to re-encrypt a core or selected part of the encrypted content file(s). This re-encryption process (described more fully below) provides unique aspects to controlling and shielding the electronic content and encryption/decryption process when the selected segment of the content file(s) is re-encrypted with a value that contains data specific to the SDC 120' and the user and/or the user's device 125. This re-encryption process is performed on the user's device without ever exposing the contents in an unencrypted form and shields the contents and the encryption keys from piracy, unauthorized access, theft or intrusion with a high degree of confidence. Since all user devices are considered to be insecure environments, it may be said that this process re-encrypts the data in a secure way in an insecure environment. After this process is executed, the content inside the SDC 120' is "locked" to a particular device (e.g., device 125) and/or a particular user. Thereafter, the SDC 120' can never be sent (perhaps by email, physical delivery, or other electronic delivery) to a different user and/or another user device and opened successfully without undergoing a new authentication process.

Figure 2:
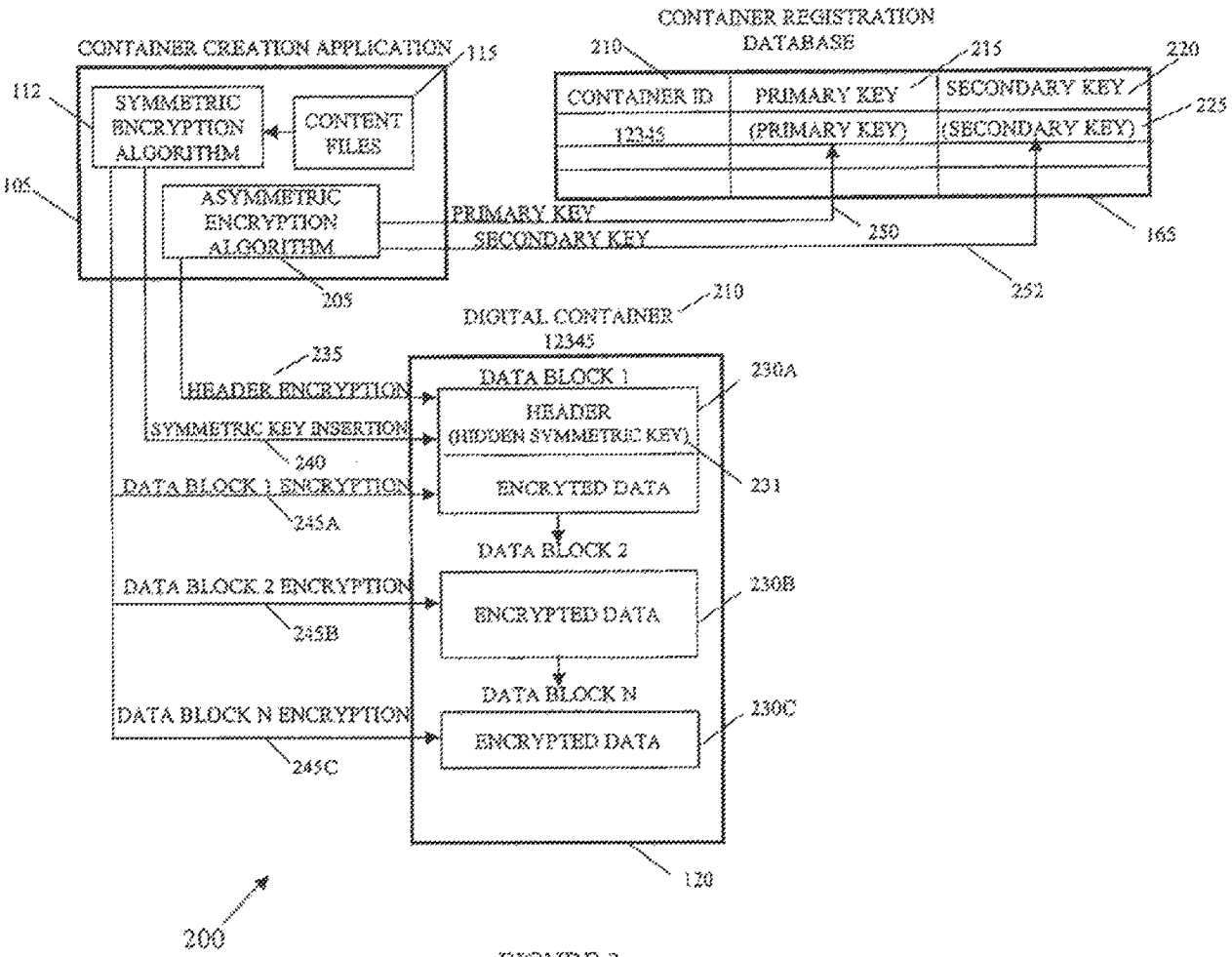
FIG. 2 is a functional block of an embodiment showing registration and encryption of a secure digital container (SDC), according to the invention.

FIG. 2 is a functional block diagram of an embodiment showing registration and encryption of a SDC, according to the invention, generally denoted by reference numeral 200. FIG. 2 also illustrates certain steps of the registration and encryption process, according to the invention. The container creation application 110 evaluates the content file(s) 115 as selected or composed by a container creator and determines an appropriate number of data blocks for partitioning the content files and to be used to encrypt these files. The number of data blocks to be encrypted may be related to the type of device being targeted (e.g., a cable box, personal computer, or other type of device), number of files being encrypted, or overall amount of data being encrypted, or as requested by a container creator, for example. The data block concept typically increases speed and efficiency of the decryption process. Also, the data block concept provides an ability to encrypt only parts of the electronic content instead of the entirety and also permits portions of the content to be optionally accessed by a user prior to any decryption. For example, if a large media file, such as a feature length motion picture is being decrypted, the user may be able to use a media player to jump to any point in the film and begin to view it without waiting for the entire file to be decrypted. Another example may be when advertisement segments, such as previews, are presented to a user prior to decryption. It should be clear by these examples that essentially any portion of the electronic material may be selected by the container creator and marked as "unencrypted," as appropriate.

Once the content file or files 115 are divided into data blocks, a symmetric encryption algorithm 112 may be used to encrypt each individual data block resulting in one or more encrypted data blocks 1-N, 230a-230c. The encryption process and insertion into the SDC 120 for each encrypted data block 230a-230c is represented by reference numerals 245a-245c, respectively. Commercially available symmetric encryption algorithms such as, for example, Blowfish™, Twofish™, Rijndael™, Serpent™ or Triple DES™ may be used. The container creation application 110 may be designed in a modular fashion, so that the encryption algorithm modules can be upgraded as new encryption technology becomes available.

As part of the symmetric encryption process, the symmetric key used to encrypt the data blocks 230a-230c, and which subsequently is to be used to decrypt these data blocks, is then inserted or "hidden" in the header of the first data block 230a, as denoted by reference numeral 240. In embodiments, this convention might include using another data block other than the first data block. After the data block(s) encryption is completed, an asymmetric encryption algorithm 205 is used to encrypt the header 231 of the first data block and render the hidden symmetric key inaccessible and secure during transmission, delivery or use. This process is denoted by reference numeral 235. Any secure asymmetric encryption algorithm, such as ElGamal, may be used for this function.

The asymmetric encryption algorithm 205 generates two decryption keys, called the primary and secondary keys 250 and 252, respectively, and are stored in a record 225 in the container registration database 165 on the container verification server 160. The primary 250 and secondary key 252 are associated with the corresponding unique SDC 120 via digital container ID 210 (also referred to as unique container ID) (e.g., 12345). Reference numeral 220 denotes the logical association of the digital container ID 210, the primary key 250 and the secondary key 252 for each unique record in the container registration database 165.

There may be a plurality of entries in the container registration database for many different digital containers and associated keys, as one of ordinary skill in the art would recognize. This illustration shows but one example. These keys may be produced based on data, in whole or in part, from the particular container ID 210. In this way, these decryption keys are made unique to that particular container. The digital container ID may be of various lengths such as, for example, 32-64 bytes, but any appropriate length may be used depending on anticipated total numbers of digital containers that may be created overall. The digital container ID may also be organized by series such that different producers of digital containers may acquire or purchase unique series (or a range) of digital container IDs, thus avoiding potential conflicts in digital container IDs.

In embodiments, the data block concept might be modified to insert different symmetric keys into the encrypted headers of multiple data blocks. For example, the data blocks may be divided into uniquely encrypted sets. Each set would be encrypted with a symmetric key unique to that set. A number of data blocks equal to the number of uniquely encrypted data block sets may then be used to store these unique symmetric keys in their header. These headers may, in turn, be encrypted with a similar number of asymmetric encryption keys sets. These keys sets may all be stored in the container registration database record for the container in question. As a result, a similar number of fingerprint keys may be created for the token assembly and eventual decryption process. Hence, this technique may be used to effectively eliminate reverse engineering and/or "hacking." This technique may also be used to allow various content files to be decrypted independently of the other content files in the container such that this scheme may be used to limit access to various independent content files within a container according to date, sequence, user or any combination of these factors.

Figure 3:
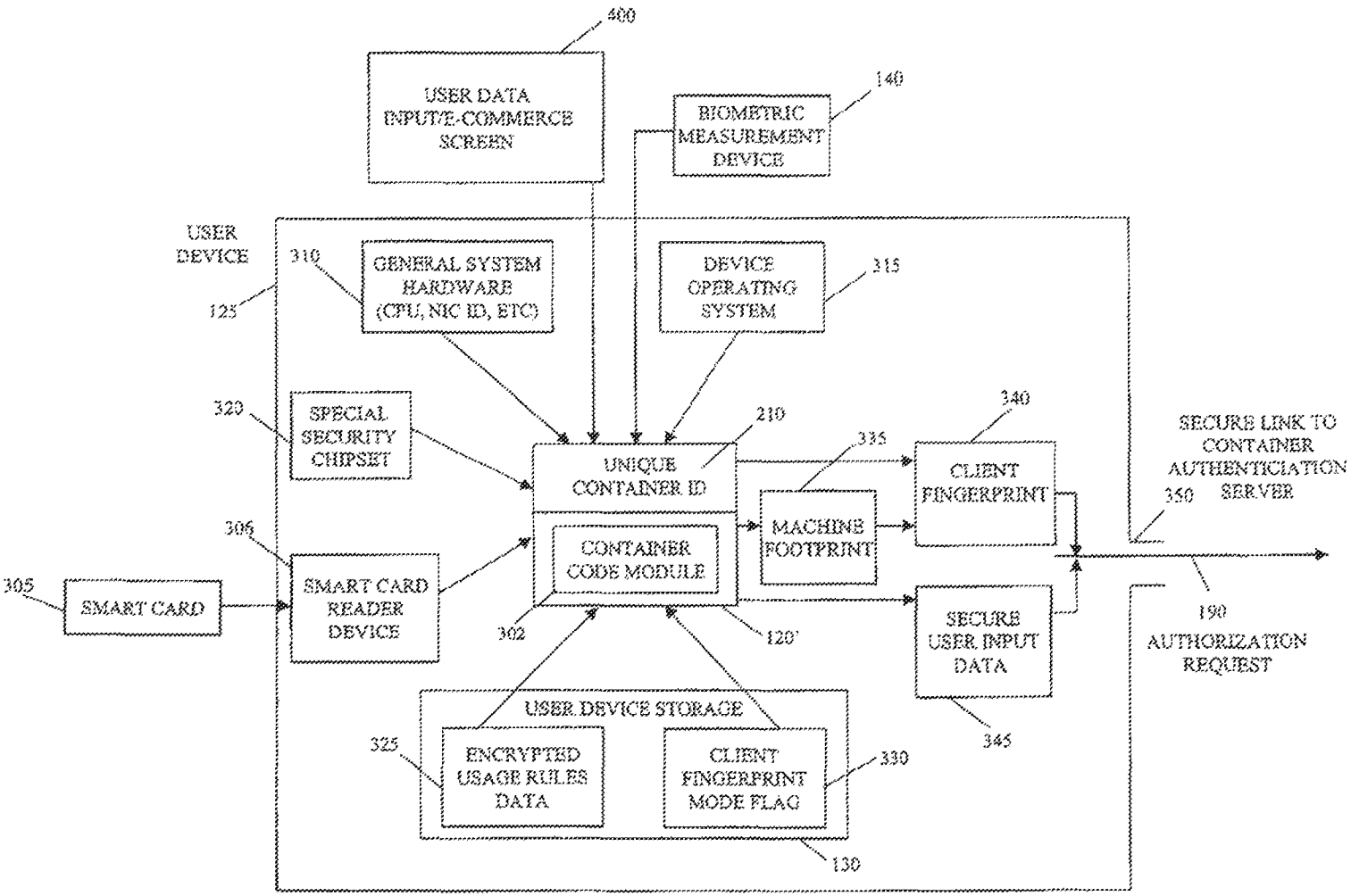
FIG. 3 is a functional block diagram of a user's device, according to the invention.

FIG. 3 is a functional block diagram of a user's device, according to the invention, generally denoted by reference numeral 125. FIG. 3 is also discussed in relation to FIGS. 1 and 2. The user's device 125 may include a SDC 120' (which may have been received via a transmission, for example) having a digital container ID 210 and may also include a container code module 302 (i.e., executable code). The user device 125 also includes appropriate system hardware 310 such as a central processing unit (CPU), network interface, power, etc. for general operations.

Also included in the user's device 125 may be an operating system (OS) 315 suitable for the type of user device, a special security chipset 320 for securely storing keys, a smart card 305 and smart card reader 306 for alternatively providing user identification data, a memory 130 for storage of encrypted usage rules 325 and the CFMF 330. The memory 130 may be logically segregated or unique to the user device 125 and may or may not be under control of the OS 315, depending on the device type and OS type.

When the digital container 120' is received at a user's computer or device 125 and the user attempts to access the protected content of the SDC 120', executable instructions 302 resident in the SDC (or perhaps already present on the user's device) searches for the CFMF 330. The CFMF 330 may already be present if the container had been previously approved to be opened on the device 125. If the SDC 120' has not been approved previously, the CFMF 330 is not found and the container code module 302 begins an approval process. In embodiments, the user might also be prompted to input various biometric measurement parameters such as fingerprints and/or retina scans in place of or in addition to the manual data input via a biometric measurement device 140. In this fashion, a variety of multi-factor authentication modes is possible for increasing the security of the authentication process The executable instructions of the container code module 302 may also read data from the user's device 125 to create a machine footprint 335. The machine footprint 335 is derived from sources on the user's computer or device such as, but not limited to, the following:

Bios version
OS version
Network Interface Card (NIC) ID
System Name
System Manufacturer
System Model
Processor Name or ID number
User Name
Physical memory identification data
Disk drive model name or ID
Display name In embodiments, unique user identification data may also be read from an "smart" card 305 that is inserted into the user's CD-ROM drive or other external memory reading device 306. This card 305 has a read/write memory capacity and may be used to store user identification data and secure financial transaction data. The container code module 302 may be programmed to read data from this card 305 and include this information in the machine footprint 335, if the card 305 is available. Data from this card 305 may be used to lock the contents of the SDC 120' to a particular user instead of a particular device. In this manner the user may securely pay for and access protected contents on any machine such as a device made available for multiple users or public use.

In another version of the invention, the container code module 302 may be programmed to read unique identification data from specialized security chipset 320 on the user's device 125. This unique identification data may be written to a protected area of the chipset 320 which cannot be accessed or altered by the user. This kind of protected identification data may be included in the machine footprint 335 and may be used to maximize security. An example of this type of application may be the secure distribution of data to a predetermined set of recipients. Each of these recipients might be furnished with a device that utilizes a specialized chipset 320 containing protected identification data so that when the machine footprint 335, computed during an authenticating phase, does not reflect the special identification data read from these protected chips, access to the contents is denied or restricted. User data may also be used to capture user data via a data input screen (e.g., GUI) 400 to create secure user input data 345. An example of GUI 400 is described below in reference to FIG. 4.

Once the appropriate machine footprint data has been selected and read, the executable instructions of the container code module 302 creates the "client fingerprint" 340. The client fingerprint 340 includes the machine footprint data 335 and the unique container ID 210.

Figure 4:
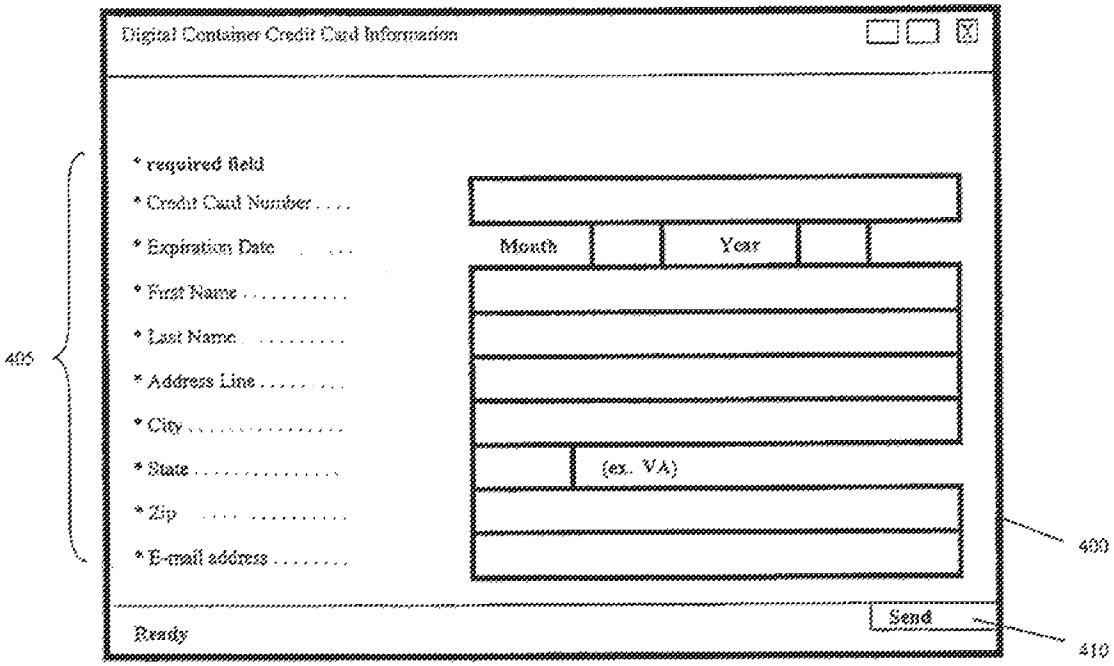
FIG. 4 is an illustrative embodiment of a Graphical User Interface (GUI), according to the invention.

FIG. 4 is an illustrative embodiment of a Graphical User Interface (GUI), according to the invention, generally denoted by reference numeral 400. The approval process may include displaying the data input/e-commerce GUI 400 to the user. This GUI 400 may be tailored according to particular targeted users or applications and may include prompts for user input data 405 such as credit/debit card numbers, expiration dates, name, address, email address or other identifying information, as appropriate. The user may also be prompted to enter demographic data or financial transaction data, such as account numbers, that may be used to purchase the contents of the container and/or products/services represented by the contents of the SDC 120'.

When the user has completed entering the form data 405 in the data input/e-commerce screen (e.g., GUI 400) and presses the "Send" button 410 on the GUI 400, the SDC 120' opens up a secure SSL link 350 to the container authentication server 160 and transmits the client fingerprint 340 and the secure user input data 345 (i.e., from user input data 405) as part of the authorization request 190. In embodiments, the user input data 405 is never stored on the user's device and is therefore securely protected throughout processing. In other SDC embodiments, user data input is not required and the process is initiated when the user attempt to open the container, bypassing prompting for user input. In this case, no user input data is sent to the container authentication server 160 with the client fingerprint 340.

Figure 5:
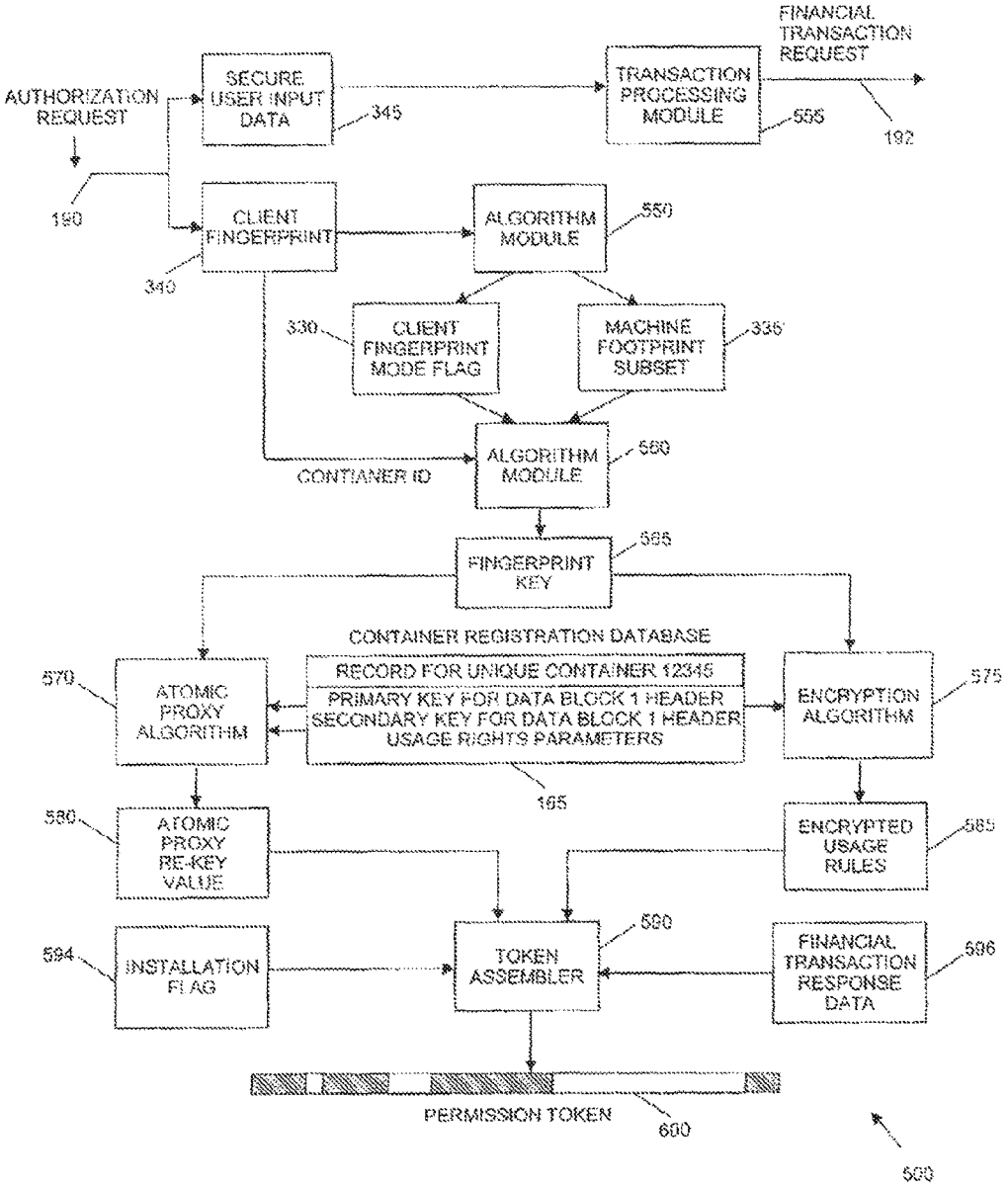
FIG. 5 is a functional block diagram of an embodiment of a container authentication and permission token generation process, according to the invention.

FIG. 5 is a functional block diagram of an embodiment of a container authentication and permission token generation process, according to the invention, generally denoted by reference numeral 500. FIG. 5 also shows certain steps of the process, which may be considered in view of FIGS. 1-4. When the container verification server receives the authorization request, any secure user input data 345 (e.g., financial transaction data) that may be included is sent to a transaction processing module 555. This transaction processing module 555 assembles a financial transaction request, if appropriate, and securely transmits it to the transaction server for transaction processing, as represented by reference numeral 192.

The container authentication server also reads the client fingerprint data 340 as received from the SDC executable code and sends it to a CFMF algorithm module 550. This CFMF algorithm module randomly selects a portion of the machine footprint data creating a machine footprint subset 335', and separately creates a CFMF 330. The CFMF 330 value may be made unique by using the container ID read from the client fingerprint 340 via a randomizing function.

The CFMF 330 is then processed by a fingerprint key algorithm module 560. This module 560 first concatenates the CFMF 330 value, the machine footprint subset 335' data and the container ID 210 into a single value. This value may be processed by a cryptographic one-way hashing function to create a fingerprint key 565. Examples of suitable hashing functions include Secure Hash Algorithm (SHA-1) and Message-Digest algorithm (MD5), as generally known by a skilled artisan.

The primary and secondary decryption keys, respectively, for the encrypted first data block 230a of the SDC 120 are then retrieved from the container registration database that were previously stored during the container registration process. An atomic proxy encryption algorithm 570, a generally known technique, combines these keys (e.g., 250, 252) with the fingerprint key 565 to produce an atomic proxy re-key value 580. An atomic proxy algorithm is typically an encryption function that can re-encrypt data on any insecure machine in a secure manner. Thus, the encrypted data (e.g., data blocks 230a-230c) may be re-encrypted while data remains secure at all times. The data is never left unprotected or exposed.

Further, the usage rights parameters for the container may be read from the container registration database 165. These parameters describe usage rules such as the number of times the user may access the contents, a period of time in which the user may access the contents, as applied to portions or the entire contents. The usage parameters may also include any subscription data that might allow the user to access other containers involved in a subscription grouping. This may be accomplished by grouping ranges of containers in to a series.

These usage rights parameters may be encrypted by a symmetric encryption algorithm 575. The previously created fingerprint key 565 may be used as the encryption key for this process. The resulting encrypted usage rules 585 data may then be provided to the token assembler 590. The previously created atomic proxy re-key value 580 may also be sent to the token assembler 590 along with a permission flag data string 594 (also known as an installation flag) and any encrypted financial transaction response 194 data 596, previously created by the transaction server 180.

The permission flag data string 594 determines whether the container code module (i.e., executable code) grants or denies access to the protected container (e.g., SDC 120') contents. Other functions might include determining what approval, denial or error message may be presented to the user. The financial transaction response data provides data that might be displayed in transaction approval or denial message when presented to the user. This financial transaction response data may include credit/debit card acceptance or rejection codes as well as purchase confirmation data.

The token assembler 590 also constructs a permission token 600. The permission token is typically a string of bytes that may include, but is not limited to:

i) header bytes that identify the start of the permission token data string and perform a handshake function.
ii) the installation permission flag.
iii) the atomic proxy re-key value.
iv) the Client Fingerprint Mode Flag.
v) the encrypted usage rights data.
vi) the encrypted financial transaction response data.
vii) trailer bytes that identify the end of the permission token data string.

Figure 6:
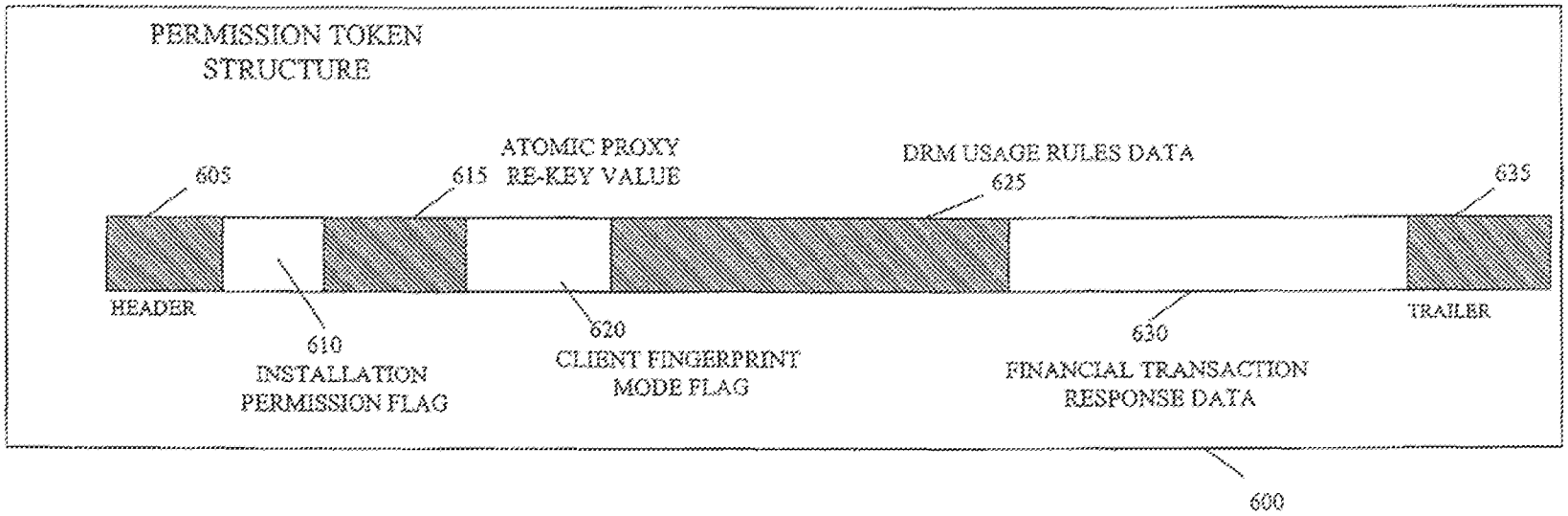
FIG. 6 is an illustration of an embodiment of a permission token, according to the invention.

FIG. 6 is an illustration of an embodiment of a permission token, according to the invention, generally denoted by reference numeral 600. The exemplary permission token 600 includes fields for a header 605 to indicate the beginning of the token, an installation permission flag 610, an atomic proxy re-key value 615, a client fingerprint mode flag 620, digital rights management usage rules data 625, a financial transaction response data 630, and a trailer 635 to indicate the end of the token. These fields of the permission token 600 are built by the token assembler 590, previously described, for transmission in a message to the SDC on the user's device. The use of these fields at the user's device is described in relation to FIG. 7.

Figure 7:
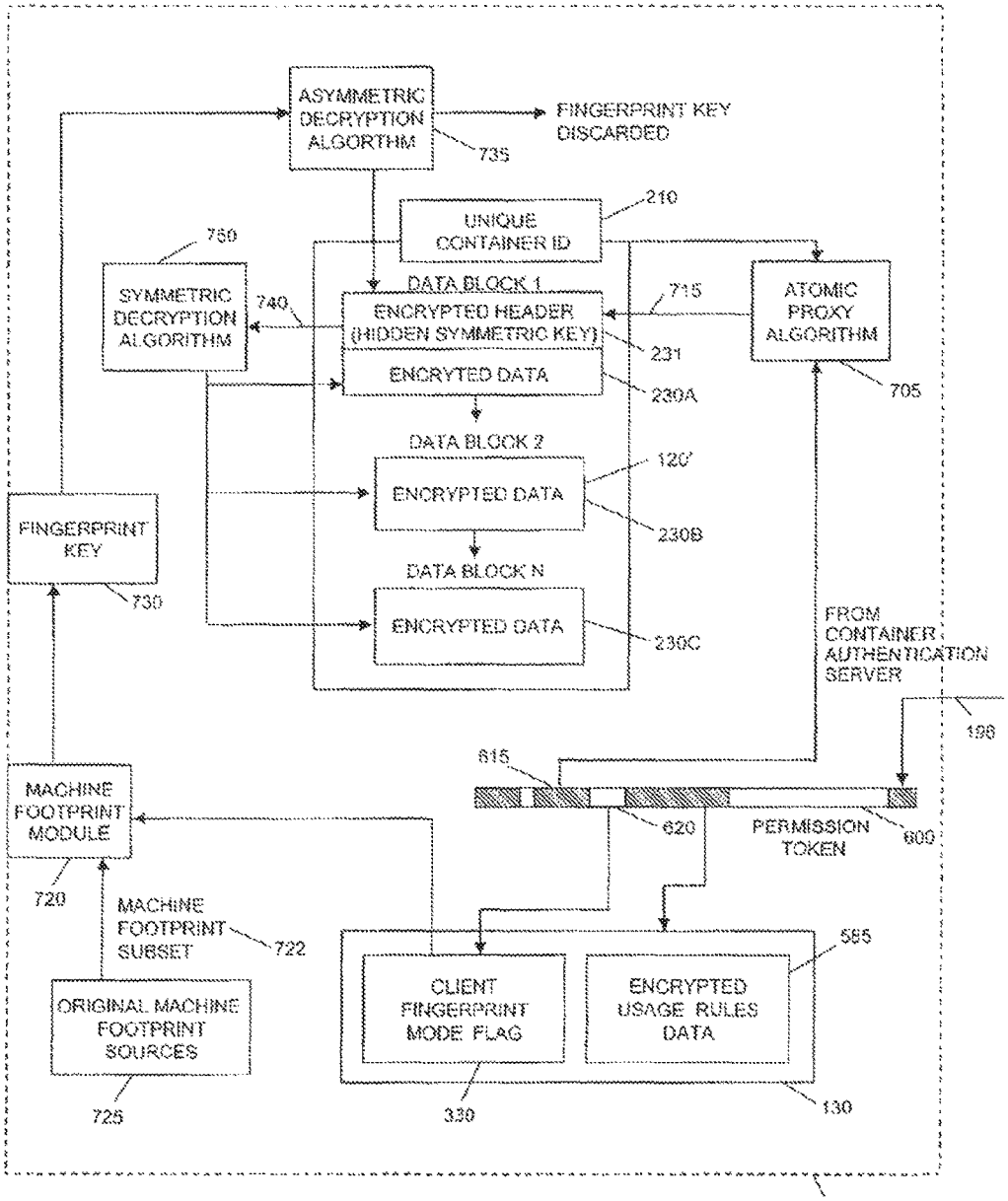
FIG. 7 is a functional block diagram of an embodiment of a decryption process, according to the invention.

FIG. 7 is a functional block diagram of an embodiment of a decryption process, according to the invention. FIG. 7 also shows certain steps of the decryption process. The permission token 600 is returned to the user's device via a permission token message (e.g., message 196 of FIG. 1) and read by the container executable instructions. The encrypted usage rules data 625 and the CFMF 620 are then stored in a confidential or "hidden" location 130 located on or associated with the user's device 125 as encrypted usage rules data 585 and CFMF 330, respectively.

The executable instructions of the container code module may read the atomic proxy re-key value 615 from the token 600. An atomic proxy algorithm 705 uses this re-key value 615, along with the unique container ID 210 read from the container, to securely re-encrypt the encrypted header of data block 1, as denoted by reference numeral 715. This one-time operation locks the encrypted content data to the user and/or the user's device 125 and takes place without ever exposing the content data in unencrypted form.

The executable instructions employ a machine footprint module 720 that uses the CFMF 330 value to determine what subset 722 of the original machine footprint sources 725 is used to create the machine footprint subset 720 that matches the similar subset created on the container authentication server 160 during the token assembly process. Once the machine footprint subset 722 is determined, it is used by the machine footprint module 720 to create the fingerprint key 730.

The fingerprint key 730 is used by an asymmetric decryption algorithm 735 to decrypt the re-encrypted header of the first content data block 231. Once the header decryption process is completed, the fingerprint key 730 may be discarded and therefore no decryption key is stored on the user's machine and available for hacking or reverse engineering. Throughout this process, the container and its content(s) are securely locked to the user's machine 125. Since the fingerprint key 730 is not stored on the user's device 125, it is re-created every time the user attempts to open the container.

When the header 231 is decrypted, the symmetric key hidden in the header is extracted as denoted by reference numeral 740 and used by a symmetric decryption algorithm 750 to decrypt the encrypted content data blocks 230a-230c. Once these data blocks are decrypted, the user may access, view, or otherwise use the content based on usage rights. The symmetric decryption algorithm 750 may be resident with the executable instruction set (i.e., container code module 302) that resides in the SDC 120' or may already be present on the user's device. This algorithm may be upgraded as new technology becomes available.

Moreover, when the user attempts to access the encrypted data in the SDC 120' at a later time, the executable instructions of the container code module 302 can locate the CFMF that was written to a hidden or confidential location during the first decryption effort. If this flag is found, the process used to create the fingerprint key 730 is repeated and this key is used to decrypt the usage rules data 130 to determine if the usage rules allow further access to the protected contents.

In this way, the user may access the content without having to repeat the over container authorization process. If the CFMF 330 is not found or if the usage rules contained in the usage rights data 130 prohibit access to the protected contents, then the executable instructions will prompt the user to repeat the authorization procedure.

Depending on what elements of the user's device or user input that were used to create the original machine footprint 335, the user may be prompted to recreate certain conditions that were in effect when the original machine foot print was created. For example, the user may be prompted to re-enter certain security codes or biometric measurements. If the Smart Card scenario was being used, the user may be prompted to re-insert this card in order to successfully reopen the container.

The machine footprint module 720 that re-creates the machine footprint subset 722 may be programmed with a variable tolerance which permits some degree of flexibility if changes in the machine footprint of the user's device occur. For example, if the machine footprint subset was created by reading eight pieces of data from the user's device, the machine footprint module 720 may be programmed to ignore changes in three of the pieces of data and still recreate the fingerprint key 730 used to decrypt the container contents.

As a result of the re-encryption technique, if the digital container is ever transmitted to a different computer or device, the executable instructions will fail to locate the CFMF when the new user attempts to access the content. If this condition is detected, the authorization process re-initiates so that the container might be associated with another user.

Figure 8A:
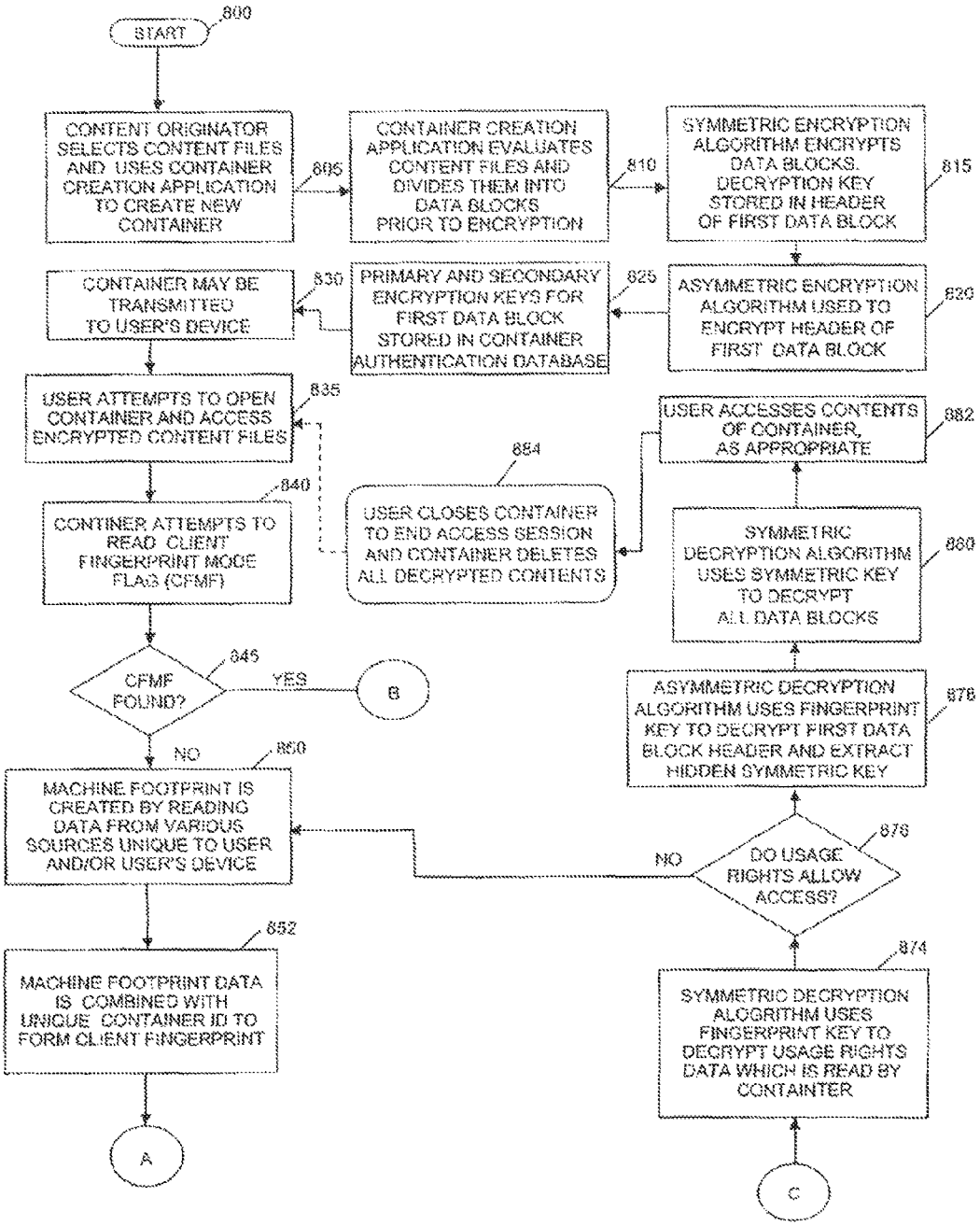
FIGS. 8A and 8B are flow diagrams of an embodiment showing steps of using the invention.
Figure 8B:
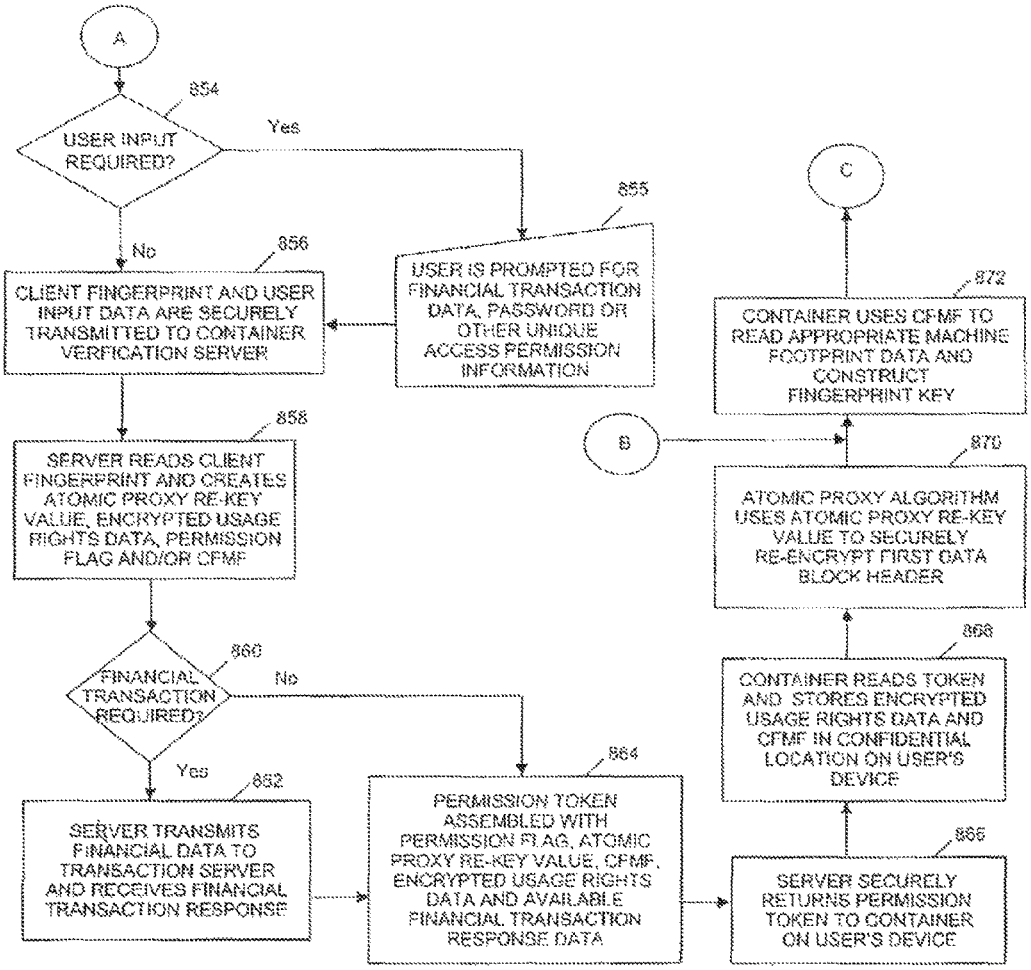
Figure 9:
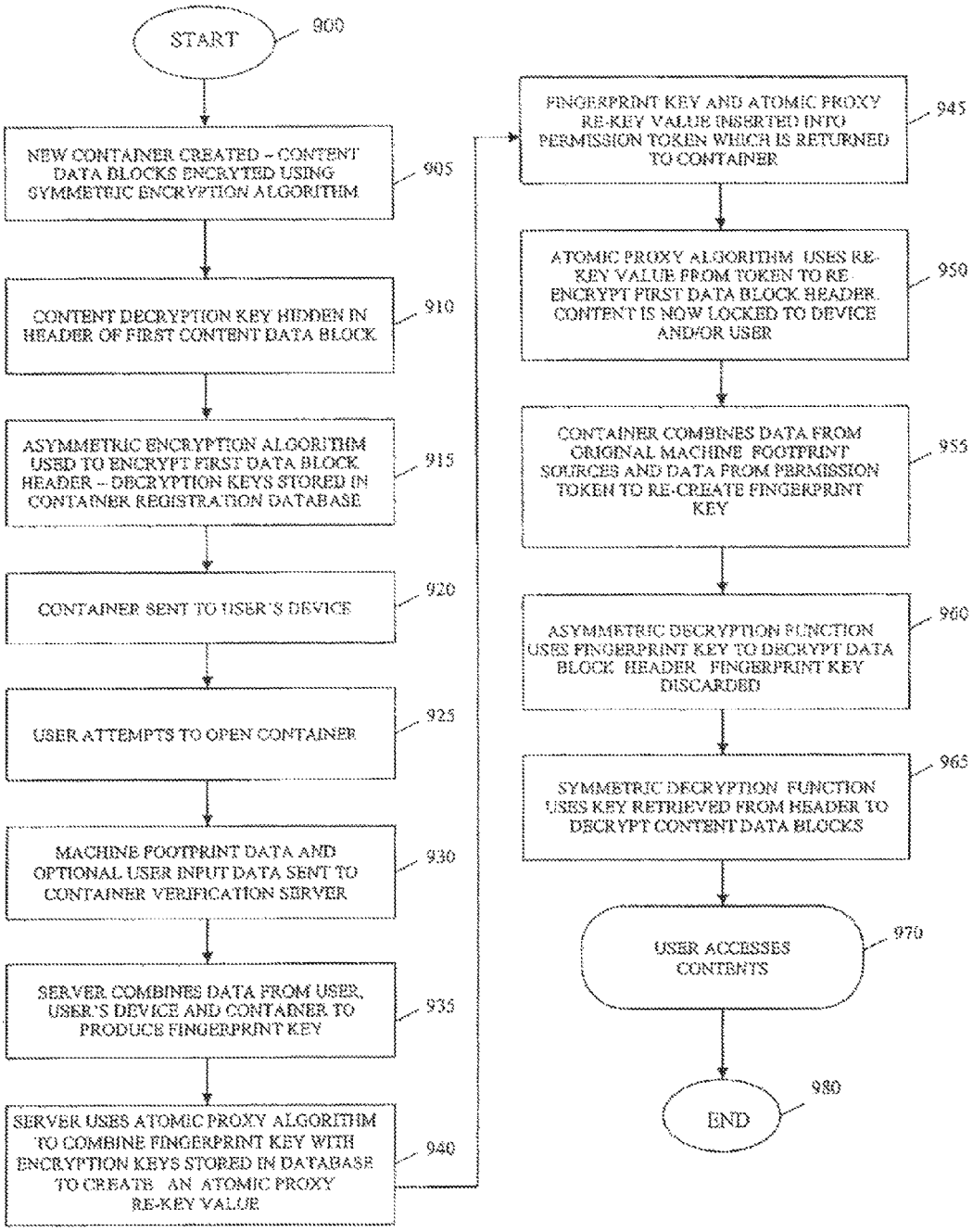
FIG. 9 is a flow diagram of an embodiment showing steps of using the invention.

FIGS. 8A and 8B are flow diagrams of an embodiment showing steps of using the invention, starting at step 800. FIGS. 8A, 8B and 9 may equally represent a high-level block diagram of components of the invention implementing the steps thereof. The steps of FIGS. 8A, 8B and 9 (and other block diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of the flow diagrams may be implemented on the system of FIG. 1.

Continuing with FIGS. 8A and 8B, at step 805 a digital container creator or originator selects one or more files to be placed in a digital container and chooses which files are to be encrypted. At step 810, content data is analyzed for data block sizing and those chosen files are encrypted by corresponding data blocks. At step 815, symmetric encryption algorithm encrypts data blocks. The symmetric decryption key may be stored or "hidden" in the header of the first data block (alternatively, in embodiments other blocks may be used).

At step 820, an asymmetric encryption algorithm may be used to encrypt the header of the first data block. At step 825, the primary and secondary asymmetric keys for the first data block may be stored in a container verification server. At step 830, the newly constructed digital container is transmitted or otherwise made available to a user's device. At step 835, a user attempts to open the container and/or access the encrypted files. At step 840, the container attempts to locate and read a CFMF on the user's device. At step 845, a check is made if the CFMF has been located. If so, then processing continues at step 872. Otherwise, if not, then at step 850, a machine footprint may be created by reading data from various sources associated with the user and/or the user's device.

At step 852, the machine footprint data is combined (e.g., by hashing) with the digital container ID to form a client footprint. At step 854, a check is made whether user input is required as determined by the digital container executable instructions. If not, then processing continues at step 856. However, if yes, then at step 855, the user may be prompted for financial transaction data, a password, an account number, or other unique access permission information. At step 856, the client footprint and user input data, if any, may be securely transmitted to a container verification server.

At step 858, the container verification server reads the client footprint and creates an atomic proxy re-key value, encrypted usage rights data, permission flag and CFMF. At step 860, a check is made whether a financial transaction is involved with container access. If not, processing continues at step 864. If yes, then at step 862, the container verification server transmits financial data to a transaction server for authenticating or processing financial data and a transaction response is generated by the transaction server to the container verification server. At step 864, a permission token may be assembled with the permission flag, atomic proxy re-key value, CFMF, encrypted usage rule (or rights) data and any available transaction response data. At step 866, the container verification server securely returns the permission token to the digital container on the user's device.

At step 868, the digital container reads the permission token and stores encrypted usage rule (i.e., rights) data and CFMF in a confidential location on the user's device or associated storage. At step 870, an atomic proxy algorithm uses the atomic proxy re-key value to securely re-encrypt the first data block header which locks the digital content to the user or user's device. At step 872, the digital container executable instructions uses the CFMF to read appropriate machine footprint data and construct a fingerprint key. At step 874, the symmetric decryption algorithm uses the fingerprint key to decrypt usage rules data.

At step 876, a check is made whether the usage rules allow access to the digital contents or portions of the digital content. If access is not permitted, processing continues at step 850, where it may be assumed that the digital container is now present on another or different device from the original device from which the client footprint was initially created and for which a re-keying (i.e., re-encrypting) under proper validations and approval (perhaps including a financial transaction) may occur for establishing the new device or user. Alternatively, processing may also terminate.

However, if access is permitted at step 876, then at step 878, an asymmetric decryption algorithm uses the fingerprint key to decrypt the first data block header and extract the "hidden" symmetric key. At step 880, a symmetric decryption algorithm uses the symmetric key to decrypt all the encrypted data blocks. At step 882, the contents of the container may be accessed by a user according to usage rules such as one-time access, execute only, print prohibited, copy prohibited, print prohibited, time-limited access, access count, or the like. At step 884, the user may close the container to end the session and all decrypted contents are deleted by the container executable instructions. The process may resume at step 835, if the user attempts to access or open the digital container.

FIG. 9 is a flow diagram of an embodiment showing steps of using the invention, starting at step 900. At step 905, a new container may be created and the contents (e.g., files) partitioned (e.g., organized into data blocks). Each data block (or each data block of a subset of the total number of data blocks) may be encrypted using a symmetric encryption algorithm. At step 910, a content decryption key may be hidden in the header of the first data block.

At step 915, an asymmetric encryption algorithm may be used to encrypt the first data block header. The asymmetric keys (e.g., primary and secondary keys) may be stored in a container registration database for later recall. Typically the database would be an independently maintained facility and securely protected. At step 920, the digital container is sent, delivered, or otherwise made available to a user's device such as a phone, personal digital assistant (PDA), PC, cable box, or other computer controller device. At step 925, a user may attempt to open and/or access the digital container and its contents.

At step 930, machine footprint data and, optionally, user input data (such as, for example, financial data, account data, credit data, a social security number, or other identifying data) may be sent to a container authentication server along with the digital container ID, typically accomplished using a secure network connection. At step 935, the container authentication server combines data from the user, user's device and digital container ID, as available, to produce a fingerprint key.

At step 940, the container authentication server uses an atomic proxy algorithm to combine the fingerprint key with the encryption keys previously stored in the container registration database for the digital container ID to create an atomic proxy re-key value. At step 945, the fingerprint key and atomic proxy re-key value may be inserted into a permission token and sent as a message to the digital container. At step 950, the atomic proxy algorithm uses the re-key value from the toke to re-encrypt the first data block header. The content of the container is now locked to the user's device and/or user.

At step 955, executable instructions associated with the digital container combines the data from the original machine footprint sources and data from the permission token to re-create the fingerprint key. At step 960, an asymmetric decryption function uses the fingerprint key to decrypt the first data block header of the digital container. Once this occurs, the fingerprint key is discarded or purged to prevent unauthorized acquisition of the fingerprint key.

At step 965, the symmetric decryption function may use the key retrieved from the decrypted header to decrypt any encrypted content data blocks. The digital container may also include non-encrypted data blocks as constructed originally by the container creator which would, of course, not required any decryption when accessed by a user. At step 970, the user may access the contents of the container as regulated by the usage rules. The user may also be prevented from accessing certain or all parts of the content based on the usage rules, or if the fingerprints do not support decryption on the user's device. At step 980, the process ends.

Environments and Examples of Using the Invention

This product brings unique capabilities to a number of digital goods distribution, e-commerce and rights management markets. These markets include, but are not limited to:

i) The secure distribution of digital entertainment goods to the general consumer market. Since the digital container and the related encryption function described by this invention are designed to operate in a variety of device and operating system environments, the product is well suited to this market. The container may be used distribute and sell such products as movies and videos, games, software, books (including audio books) periodical or the like. These items may be securely distributed to cable television set-top boxes, personal computers, tablet computers, handheld computing devices and mobile phones, just to name a few.

ii) The legal distribution of digital goods in a Peer-To-Peer (P2P) environment. The on-board e-commerce and access tracking features of the product make it especially useful in the P2P marketplace.

iii) The self publishing marketplace. The digital container product allows users to create and e-commerce-enable their own publishing and media distribution objects. Authors can publish and sell their own books, stories and articles at a fraction of the price of current publishing requirements. Musicians can create multimedia containers which promote and sell their music without having to deal with any expensive record labels.

iv) The personal records privacy and regulations compliance marketplace. Hospitals, private doctors and law firms can containerize and store the private records of patients and clients. These records may be retrieved and securely transmitted to authorized recipients such as government agencies or insurance firms as needed.

v) The secure distribution of documents and files for corporations and government agencies. The pre-registration of distribution lists on the Container Authentication Server combined with the multi-factor authentication features of this invention provide for an extremely effective method of secure document distribution. The containerization concept allows this secure distribution to take place outside of corporate LANs and across multiple devices and operating systems.

vi) Secure financial transactions using the Smart Card concept. The Smart Card is an intelligent card that may be inserted into a non-specialized reader device such as a CD-ROM drive. The card is designed to hold secure personal identification data along with financial account data. Customers may use ATMs to deposit money onto the card and it can be used to purchase items in brick and mortar establishments like any bank debit card. But it could also be inserted into a computing device to execute secure purchases of containerized digital goods. Identification data from the card may be used in the authentication process described by the invention to lock digital goods to a user and not just to a device. In this way, a customer may access secure containerized files on any device, such as work computers setup for multiple users or public use devices such as computers at public libraries. In this manner a Personal Media Virtual Library concept can be created. The Smart Card can be used to purchase containerized digital goods which are then stored in an individualized "virtual library." This library would consist of storage space purchased from an internet vendor. The Smart Card would contain the secure URL of this individualized library which would allow the user to access previously purchased containers from any device in any location.

While the invention has been described in terms of embodiments, those skilled in the art will recognize that the invention can be practiced with modifications and in the spirit and scope of the appended claims.

We claim:

1. A computer-implemented method for protecting electronic content, the method comprising the steps of:

[storing an asymmetric decryption key that is associated with a digital electronic container;]

receiving client device footprint data from a client device;

creating a re-key value using both the client device footprint data and [the stored] *an* asymmetric decryption key *that is associated with a digital electronic container*; and providing the re-key value to the client device for re-keying content data [provided by] *of* the electronic digital container at the client device wherein a predetermined data block of the content data [stores] *contains* a symmetric decryption key, the predetermined data block and [stored] *the symmetric* decryption key being previously encrypted using an asymmetric key technique, and wherein the content data is arranged into data blocks including the predetermined data block.

2. The computer-implemented method of claim 1, wherein all of the data blocks are encrypted using a [systematic] *symmetric* key technique.

3. The computer-implemented method of claim 1, wherein the digital electronic container is configured with executable instructions that are configured to execute at the client device to combine the client device footprint data and the re-key value to create a fingerprint key, the fingerprint key for decrypting the predetermined data block thereby providing access to the symmetric decryption key.

4. The computer-implemented method of claim 1, wherein the step of providing the re-key value to the client device includes sending the re-key value as part of a permission token.

5. The computer-implemented method of claim 4, wherein the permission token includes a fingerprint key.

6. The computer-implemented method of claim 1, wherein the step of receiving receives user input data and the step of creating produces a fingerprint key.

7. The computer-implemented method of claim 6, wherein the user input data includes any one or more of: *financial transaction data, expiration data, an email address, demographic data,* financial data, account data, credit data, a social security number and identifying data.

8. The computer-implemented method of claim 1, wherein the step of creating uses a container identifier associated with the digital electronic container to produce a fingerprint key.

9. The computer-implemented method of claim 8, wherein the providing step sends the re-key value and the fingerprint key as part of a permission token.

10. A computer program product comprising computer executable instructions embodied on a non-transitory computer readable storage medium that when read and executed by a computer processor executes the following steps:

[storing an asymmetric decryption key that is associated with a digital electronic container;]

receiving client device footprint data from a client device;

creating a re-key value using both the client device footprint data and [the stored] *an* asymmetric decryption key *that is associated with a digital electronic container*; and providing the re-key value to the client device for re-keying content data provided by the digital electronic container to the client device wherein a predetermined data block of the content data [stores] *contains* a symmetric decryption key, the predetermined data block and [stored] *the symmetric* decryption key being previously encrypted using an asymmetric key technique, and wherein the content data is arranged into data blocks including the predetermined data block.

11. The computer program product claim 10, wherein all of the data blocks are encrypted using a [systematic] *symmetric* key technique.

12. The computer program product of claim 10, wherein the digital electronic container is configured with executable instructions that are configured to execute at the client device to combine the client device footprint data and the re-key value to create a fingerprint key, the fingerprint key for decrypting the predetermined data block thereby accessing the symmetric decryption key.

13. The computer program product of claim 10, wherein the step of providing the re-key value to the client device includes providing the re-key value as part of a permission token.

14. The computer program product of claim 13, wherein the permission token includes a fingerprint key.

15. The computer program product of claim 10, wherein the step of receiving receives user input data and the step of combining produces a fingerprint key.

16. The computer program product of claim 15, wherein the user input data includes any one or more of: financial data, account data, credit data, a social security number and identifying data.

* * * * *